July 8, 1947.  L. B. KOONTZ  2,423,781
CONTROL APPARATUS
Filed March 9, 1943  3 Sheets-Sheet 1
FIG. 1
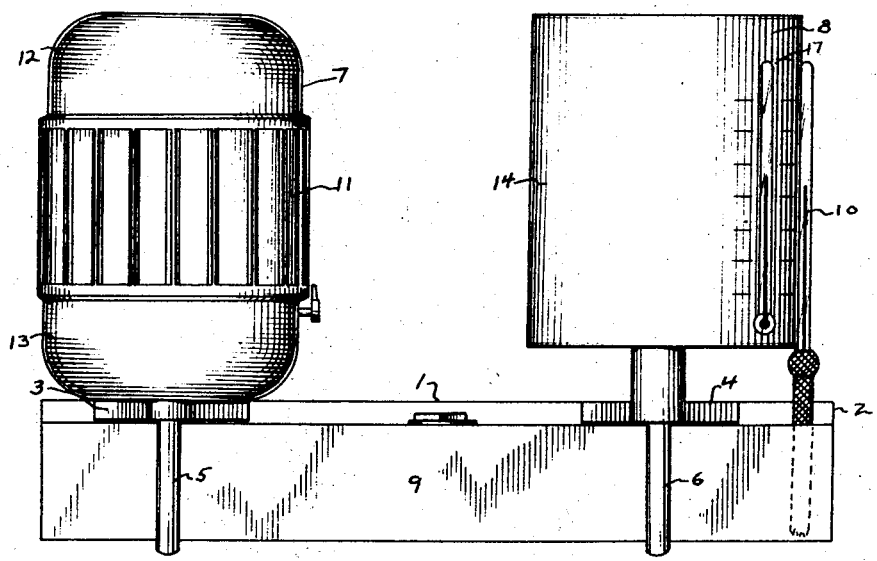
FIG. 2
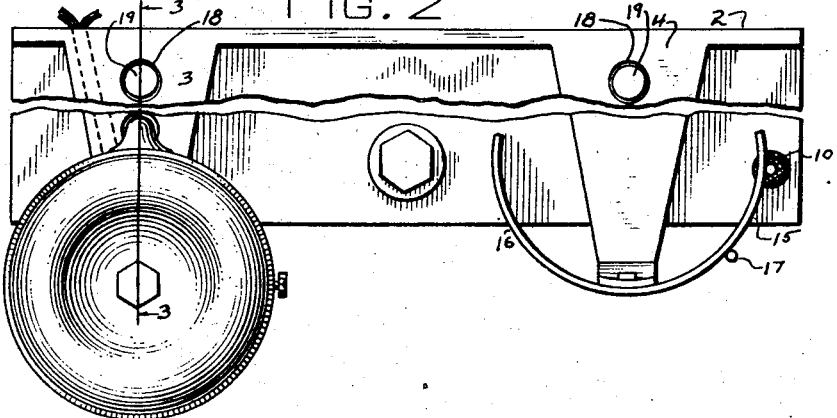
FIG. 3
FIG. 4
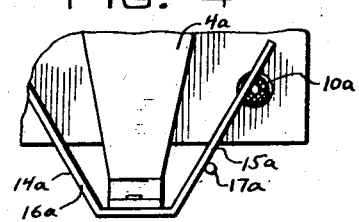
INVENTOR July 8, 1947.　　　L. B. KOONTZ　　　2,423,781
CONTROL APPARATUS
Filed March 9, 1943　　　3 Sheets-Sheet 2

Leonard B. Koontz
INVENTOR

July 8, 1947. L. B. KOONTZ 2,423,781
CONTROL APPARATUS
Filed March 9, 1943 3 Sheets-Sheet 3

Leonard B. Koontz
INVENTOR

Patented July 8, 1947

2,423,781

UNITED STATES PATENT OFFICE 2,423,781

CONTROL APPARATUS

Lamont Burton Koontz, Deer Lodge, Mont.

Application March 9, 1943, Serial No. 478,580

18 Claims. (Cl. 236—68)

It is well known that, in addition to the temperature of the air in a habitation, human comfort is also dependent on the motion of the air, the relative humidity of said air and the temperature of adjacent masses. Instruments responsive to these four conditions are known to the art and are generally of the heat emissive type wherein an attempt is made to duplicate the thermal and other characteristics of the human body. It is to this type of device that the present invention is directed, hence it is an object of the present invention to make an improved space condition responsive means of the heat emissive type.

It is considered that, in some heating and air conditioning systems, the humidity may be kept within a desired range by separate control means or that humidity changes which may occur would be of little consequence hence the inclusion of means responsive to changes of humidity would represent needless complication; therefore, it is a further object to provide a space condition responsive means in which humidity may or may not, with a minimum change of structure, be one of the controlling factors.

It is a further object to make a space condition responsive means which has a minimum of time lag during changing space conditions and, closely related, it is an object to keep the mass and heat capacity of the active elements of the device at a minimum.

It is a further object to construct a device which is responsive to conditions at any angle from the instrument and the response of which will be due to the average effect of conditions from every angle.

It is an object to increase the speed of action of a device of the sort described by inducing a circulation of air within said device.

It is an object to secure air circulation within the device by separating heated air from cooled air by partition or baffle means, the air being heated by a heating element and cooled by the outer shell of the device.

It is a further object to construct and arrange a device incorporating a heat emissive space condition responsive means and thermometers in close proximity in such fashion that the heat from the said means will have a minimum of effect on the thermometers.

It is a further object to provide a single source of liquid for a space condition responsive means having an evaporative surface and a wet bulb thermometer.

It is an object to provide improved evaporative surface means for devices of the sort described by minimizing the mass of the same, by increasing the effective surface, by improving the distribution of liquid to said surface and by providing simplified liquid feeding means to said surface.

It is a further object to construct a device of the sort described in which the relative amounts of evaporative surface and non-evaporative surface may be altered with a minimum of structural change.

These and other objects will become apparent upon studying the following specification and the related drawings in which, Fig. 1 is an elevation view of a device incorporating a space condition responsive means of the sort described and a dry and a wet bulb thermometer.

Fig. 2 is a plan view of the device of Fig. 1.

Fig. 3 is a partial section taken on the line 3—3 of Fig. 2.

Fig. 4 shows a modified thermometer support and baffle, as in Figs. 1 and 2.

Figure 5:
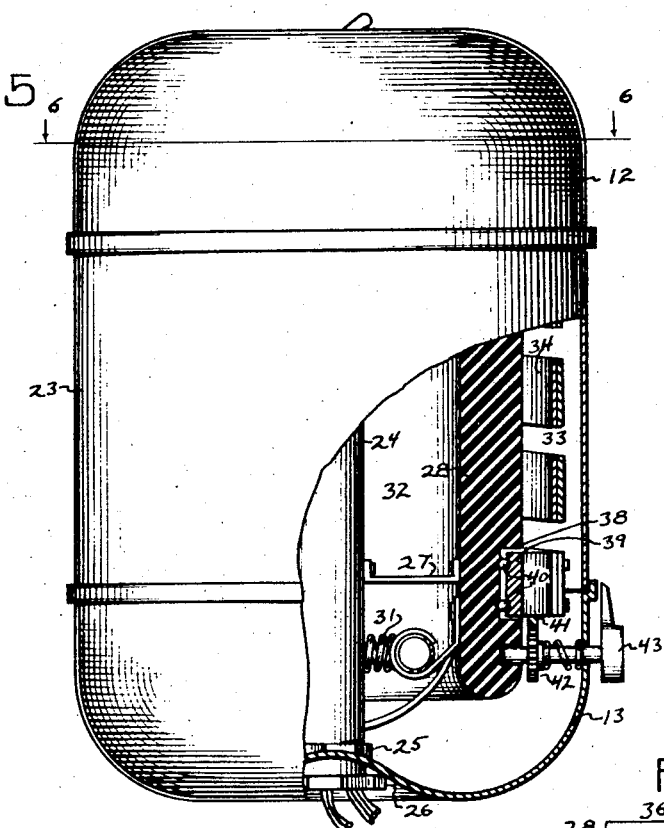
Fig. 5 is an elevation view, parts broken away and in section, of a condition responsive means without an evaporative surface.

In this disclosure and the claims, space condition responsive means is considered to be means responsive to any one, or any combination, of the factors relating to human comfort such as air temperature, air motion, humidity of said air and the temperatures of adjacent masses, these being the usual physical conditions which influence human comfort.

Referring again to Fig. 1, bracket 1, comprising a back attaching plate 2, supporting arms 3 and 4 and adjustable hook members 5 and 6, forms a support for a space condition responsive means of the heat emissive type 7 and temperature measuring means 8, the means 7 being carried by arm 3 and the means 8 by arm 4. Supporting hooks 5 and 6, pivotally attached to arms 3 and 4, respectively, detachably support tank 9 which carries a fluid, such as water, useable by the wet bulb thermometer 10 and the evaporative surface 11 of means 7.

The entire outer shell of means 7, comprising evaporative surface means 11, top cap 12 and base portion 13, serves as heat emissive surface. Temperature measuring means 8 comprises a plate 14, or 14a as in Fig. 4, having a thermometer carrying portion 15, or 15a, and a baffle portion 16, or 16a, the thermometer carrying portion normally carrying a dry bulb thermometer 17, or 17a, and wet bulb thermometer 10, or 10a, the baffle portion 16, or 16a, protecting the thermometers from any heat radiated from means 7. The normal air movement within the room circulating on either side of the baffle and the thermometer plate tends to carry away any extra heat absorbed by said plates from said means and enables the thermometers to give reasonably accurate indications of the conditions within the room. Indicia (not shown) interpreting the readings of the thermometers, or other such material, may be inscribed on the baffle plate, the thermometer plate, or both, as seen fit. Fig. 3 shows the arrangement of plate 2, arm 3, hook 5, and further shows hole 18 and guide pin 19 for positioning the tank and shows holes 20 and 21 for receiving stem 22 of evaporative surface means 11. Tank 9 may be removed by swinging hook arms 5 and 6 through a right angle and out from under the tank, thus permitting said tank to be lowered away from the support means. The tank may be filled thru a suitable opening or may be supplied by piping and a float valve (not shown), or by any other convenient and known means.

The arrangement of the parts of condition responsive means 7 is shown in Fig. 5 wherein top cap 12, bottom portion 13 and intermediate section 23 comprise the outer shell, which parts are held together by the threaded tube 24 and nuts 25 and 26 coacting with the bottom portion and the top cap. Attached to tube 24 by brackets 27 is an annular partition or baffle means 28, on the inner surface and near the bottom of which is attached brackets 29 and terminal brackets 30 which carry a heating element 31, said element being the source of the heat emitted by the outer shell. Partition member 28 is shown as being constructed of solid hard rubber but it may comprise other materials such as synthetic resins, pressed cork, fibrous materials with a resin binder, or any other suitable material. Further, the member may be hollow, and instead of parallel inner and outer surfaces, it may have a restricted portion near the heating element.

In operation, the element 31 warms the adjacent air which rises up the central space 32 of the annular partition until it reaches cap portion 12 where it is deflected outwardly and downwardly along the outside of the partition 28. The outer shell is heated by this warm air but as it receives the heat, it also cools the air hence this deflected air is cooled upon contacting the said shell. The air then travels down space 33 between the outer shell and the outer surface of the annular partition 28 until it is deflected by bottom portion 13 toward space 32 where it is again heated, thus circulation of the air is induced and maintained by the heating of the central core of air and cooling of the outer layer of air. The heat input is normally small and constant, only a few watts of current being used and, under conditions of human comfort, should maintain the outer shell at approximately body temperature so that the heat loss from the outer shell will be proportional to that lost by the human body.

In a condition of equilibrium, the air temperature at any specific place within the shell will tend to remain constant, the air within the core being warmer than that between the shell and the partition and the heat loss from the shell will just balance the heat supplied by element 31. Space conditions, such as air temperature, air movement, relative humidity and the temperature of adjacent masses, which affect human comfort, will also affect the rate of heat loss from the outer shell, the temperature of the shell and the temperature of the air within the shell hence it will be seen that the air temperature at any specific location within the shell will vary with said outside space conditions.

Figure 7:
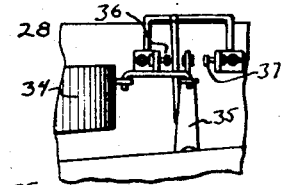
Fig. 7 is an elevation view of the switch shown in Fig. 6.
Figure 6:
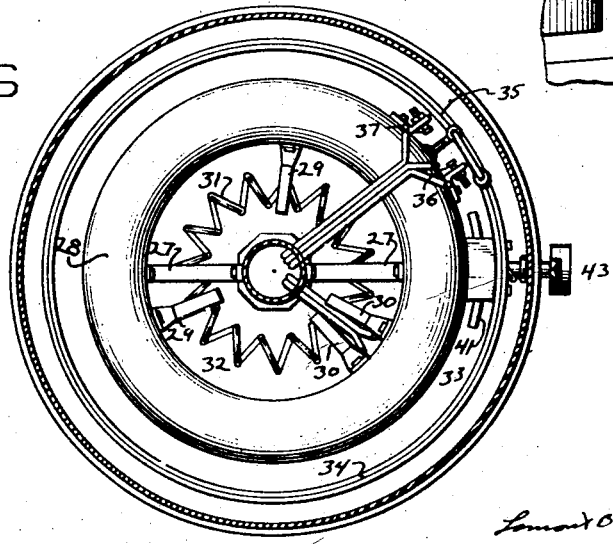
Fig. 6 shows a horizontal section taken on line 6—6 of Fig. 5.

A bi-metallic strip 34, Bourdon tube, or other temperature responsive means, is arranged concentric with and spaced from the annular partition 28 and the outer shell so as to be fully responsive to temperature conditions within the shell, said strip being connected to switch means, such as a pivoted arm 35 which coacts with contact points 36 and 37. The switch means shown in Figs. 6 and 7 is intended to be illustrative only for it is contemplated that any suitable switch means, such as a mercury switch, snap action switch, multi-stage switch, double action or other known switches, fluid control means, or other devices, may be used. An adjustable mounting is shown in Figs. 5 and 6 which comprises a groove 38, a band 39 rotatably mounted within said groove and upon ball bearings 40, said band being rigidly secured to an end of the bi-metallic strip. The band is rotated by means of a rack 41 and gear 42 which is actuated by knob 43. This mounting is to be considered illustrative for other mountings are contemplated; for instance the one end of the bi-metallic strip may be rigidly anchored to 28 and the switch made adjustable; the end of the bi-metallic strip may be anchored on a skeleton wheel or frame pivoted on the central tube, and the actuating means may comprise a handle extending through a slot in the shell, or other such device.

Figure 10:
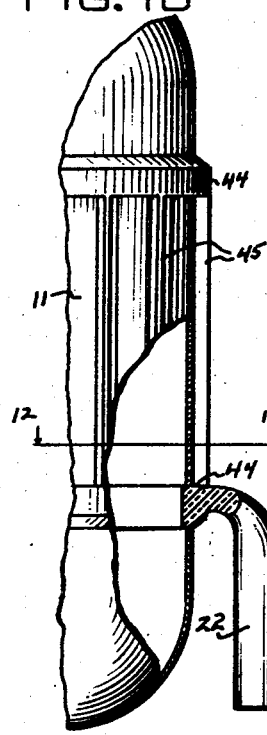
Fig. 10 is a partial elevation view, with parts in section, of a modified shell construction incorporating an evaporative surface which may be substituted for the shell of Fig. 5.
Figure 11:
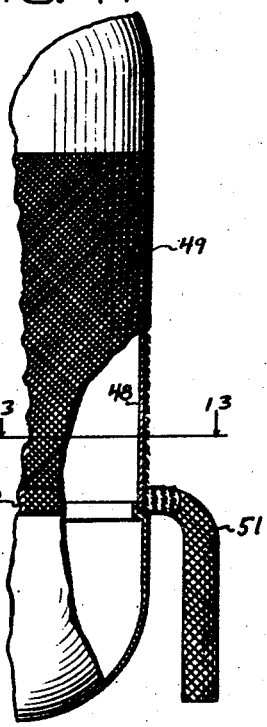
Fig. 11 is a view similar to Fig. 10 showing another modified shell construction.
Figures 12, 13, 14:
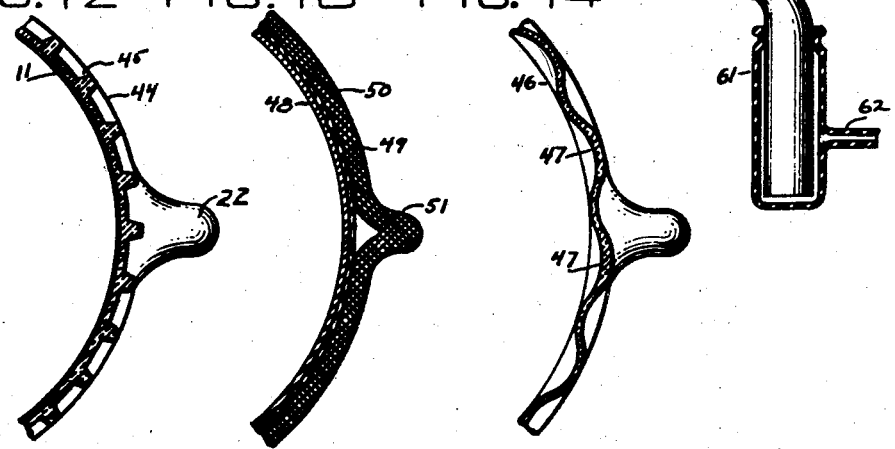
Fig. 12 is a horizontal section taken on the line 12—12 of Fig. 10.
Fig. 13 is a horizontal section taken on the line 13—13 of Fig. 11.
Fig. 14 is a view similar to Figs. 12 and 13 of a modified shell construction.

The outer shell of Fig. 5 does not have an evaporative surface but in Figs. 10 to 14 are shown modifications of the outer shell which do provide an evaporative surface. Figs. 10 and 12 show a member 11 of unglazed ceramic, or other porous, self-supporting material capable of capillary action, which may be substituted for intermediate section 23 of Fig. 5, and which member comprises rim portions 44 and rib portions 45 which connect said rim portions, and an appendage or stem 22 is formed as an integral part of a rim portion. Water, or other liquid, is absorbed by stem 22 and distributed throughout the entire member 11 by capillary action, the rims 44 and ribs 45 assisting in evenly distributing the liquid to all of the surface. In addition, the ribs provide additional surface for heat exchange and evaporation, reenforces structure 11 and helps keep the total mass of 11 at a minimum. In Fig. 14 is shown a partial section of a member 46, similar to 11, in which the surface is corrugated, the corrugations being provided with thickened portions 47, spaced as desired, to serve the functions of the ribs 45 in the previous example. Figs. 11 and 13 show evaporative surface means comprising an inner metal shell portion 48 and an outer fabric or felt layer 49 having a thickened rim portion 50 and a stem 51.

It is contemplated that the inner surface of members 11 and 46 may have inner evaporative surfaces or may have their inner surfaces glazed or coated with a suitable waterproof coating or the like. If evaporation is permitted on the inner surfaces of said members, an inconspicuous hole (not shown) may be placed somewhere in the shell or other means provided to permit a balancing of vapor pressure between the inner space and the outside atmosphere to prevent condensation in said space when the device is inoperative. The relative proportion of evaporative and non-evaporative surface may be altered by making the central or intermediate section comprise a desired proportion of the entire shell, this being most easily done by altering the height of the evaporative surface.

No wiring diagrams are shown for it is contemplated that the present device will be used in control circuits in a manner well known to those skilled in the art.

Figure 8:
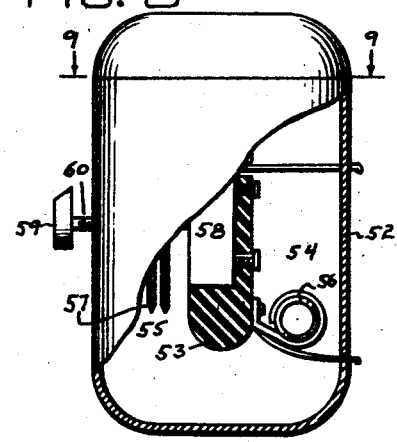
Fig. 8 is an elevation view, partly in section, of a modified device of the sort shown in Fig. 5.
Figure 9:
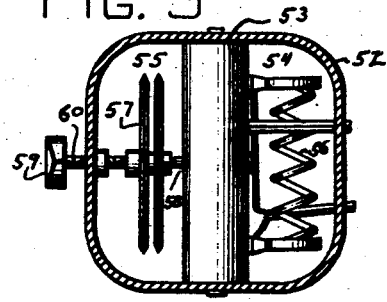
Fig. 9 is a horizontal section taken on line 9—9 of Fig. 8.

The structure of Figs. 8 and 9 is a modified form of a device similar to that of Fig. 5 wherein shell 52 encloses a partition 53, of material similar to that of 28, which divides the inner space into portions 54 and 55 and wherein a heating element 56 is secured near the bottom of space portion 54 and a thermally responsive device 57 is adjustably mounted in portion 55. Thermally responsive device 57 coacts with a snap action switch 58 and is adjusted by knob 59 and threaded shaft 60. Here, as in Fig. 5, the air circulates around the partition and furnishes a uniform supply of heat to shell 52 and wherein space conditions affecting the temperature of shell 52 will affect the temperature of the air within the shell and the responsive means 57, as in the previous example. Here too, the temperature responsive means, the switch, and the adjustment means used are considered as illustrative. Further, it is contemplated that at least a portion of shell 52 enclosing space portion 55 may comprise an evaporative surface if desired.

Figure 15:
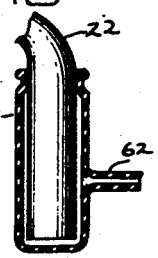
Fig. 15 is an elevation view, parts in section, of modified means for supplying liquid to the evaporative surface.

In Fig. 15 is shown a modified manner of supplying liquid to the evaporative surface wherein stem 22 has its lower end enclosed by a rubber bag 61 which is connected by a tube 62 to any suitable source of liquid such as a float controlled reservoir. Stem 22 may be attached to either top or bottom rim 44.

The specific examples given in the above disclosure are considered illustrative of the present invention and its scope is to be determined by the following claims.

I claim:

1. In a condition responsive control device of the heat emitting type, an outer shell enclosing an air space, said outer shell being a good heat conductor between inner and outer surfaces of the shell and having relatively low heat capacity, a substantially vertical partition means partially dividing said enclosed space, said partition means permitting air flow along its surfaces and across its upper and lower portions, means within the shell for continuously and uniformly emitting heat when energized by an electric circuit, and temperature responsive means independent of said circuit within said space located between said partition means and said shell in such manner that it responds to the resultant effect of said heat emitting means and the relative cooling effect of said shell.

2. Control apparatus of the heat emitting type for controlling the condition changing means of a room comprising, in combination, an outer shell enclosing an inner fluid containing space, said shell having good heat conductivity between its inner and outer surfaces and having relatively low heat capacity so that conditions within said room may readily affect conditions within said inner space, a source of heat near a bottom portion of said enclosed space, temperature responsive means within said space, and vertical baffle means between said source of heat and said temperature responsive means, said baffle means being constructed and arranged within said shell in a manner to permit fluid circulation within said shell due to the heat from said source so that said temperature responsive means may respond to the temperature of said fluid resulting from heat added by said source and heat lost through said shell.

3. In a device of the heat emitting type for controlling the condition changing means of a room, a thin heat conductive outer shell enclosing a fluid containing space, partition means partially dividing said space into a plurality of portions in a manner to permit fluid flow from one space portion to another above and below said partition means, a source of substantially constant heat near the bottom of one of said space portions, switch means for controlling said condition changing means, and temperature responsive means in another of said space portions, said other portion being bounded at least in part by said outer shell, said temperature responsive means being operatively connected to said switch means.

4. In a condition responsive control device of the heat emissive type, a relatively thin heat conductive shell enclosing a fluid containing space, vertical baffle means partially dividing said space into two portions in such manner that fluid may flow from one portion to another above and below said partition means, an electrical heating element intended to be constantly and uniformly energized and located near the bottom of one of said portions, the other of said portions being bounded at least in part by said shell, energy control means, and temperature responsive means in said other portion operatively connected to said energy control means, said heating element when energized causing a fluid convection current around said partition and in contact with said shell, said circulating fluid heating said shell and said shell cooling said fluid, said temperature responsive means responding to the resultant of the heating effect of said element and the cooling effect of said shell.

5. A device as in claim 4 wherein a portion of said shell comprises an outer evaporative surface means and wherein said portion may be directly contacted by said circulating fluid.

6. A device as in claim 4 wherein said shell comprises top, bottom and intermediate sections, said intermediate section having a porous and liquid absorptive outer surface means.

7. A device as in claim 4 wherein said shell comprises top, bottom and intermediate portions, said intermediate portion consisting solely of porous material capable of capillary action and exposed to contact by said circulating fluid.

8. A device as in claim 4 wherein an intermediate section of said shell includes porous means capable of capillary action, said porous means comprising thickened edge portions and intervening relatively thin portions, one of said thickened portions having integral therewith an appendage for receiving liquid and delivering same to said one thickened portion.

9. The device of claim 4 wherein the outer shell comprises a section composed of porous material capable of capillary action, said section comprising an interconnected network of thickened portions surrounding relatively thin portions, one of said thickened portions being arranged to receive an evaporative liquid, said network being useful for uniformly distributing liquid by capillary action throughout said section.

10. The device of claim 4 wherein the outer shell comprises a section composed of porous material capable of capillary action, said section comprising an interconnected network of thickened portions surrounding relatively thin portions, one of said thickened portions being arranged to receive an evaporative liquid, said network being useful for uniformly distributing liquid by capillary action throughout said section, the inner surface of said section being waterproof.

11. In a condition responsive controller of the heat emitting type, an annular partition member having an inner space, a source of heat near the bottom of said space and so disposed that a fluid heated by said source will tend to rise through said inner space of said member, a temperature responsive means concentric with and spaced outwardly from the outer surface of said member, energy control means, said energy control means being connected to said temperature responsive means for operation thereby, and an enclosing relatively thin heat conductive shell concentric with and spaced from said partition member and said temperature responsive means to thus form a closed circuit for convection currents of fluid which may rise through said inner space and descend between said member and said shell.

12. A controlled such as that of claim 11 wherein a predetermined portion of said enclosing shell consists of porous means capable of capillary action.

13. In a condition responsive control device, an annular outer shell member constructed of porous self-supporting material capable of capillary action, said member having thickened edge portions connected by spaced thickened rib-like portions, intervening relatively thin portions joining said thickened portions, and means for introducing liquid to one of said thickened portions.

14. In a condition responsive control device, an outer shell section composed of porous ceramic material capable of capillary action, the edges of said section being relatively thick, relatively thick rib-like portions connecting said edge portions and forming an interconnected network of thickened portions, relatively thin portions of said material connecting said thickened portions, and a homogeneous appendage extending from one of said thickened portions for receiving liquid.

15. In a condition responsive control device of the heat emissive type, an enclosing relatively thin heat conductive outer shell, a vertical partition member spanning the space between opposed portions of said shell and dividing the space within the shell into two portions, said partition being spaced from the top and bottom of said shell, a heating element near the bottom of one of said portions, an energy control means, and temperature responsive means in the other of said portions for operating said energy control means, said energy control means and said temperature responsive means being operatively independent of said heating element.

16. In a condition responsive control device, an annular outer shell member bounded by thickened edge portions, said thickened edge portions being connected by spaced relatively thick rib portions, and relatively thin web portions connecting said rib portions and said edge portions, said member being homogeneous and capable of capillary action.

17. In combination, an adjustable condition responsive control device of the heat emissive type, temperature indicating means for guidance in adjusting said device, and means including a generally convex baffle means arranged between said device and said indicating means in a manner to protect said indicating means from direct radiation of heat by said device, said baffle means including a heat shielding portion and a supporting portion, said indicating means being arranged adjacent an outer surface of said supporting portion.

18. In combination, an adjustable condition responsive control device of the heat emissive type, said device including an evaporative surface, temperature and humidity indicating means for guidance in adjusting said device, and baffle means arranged between said device and said indicating means to protect said indicating means from heat radiated by said device, said baffle means including a heat shielding portion facing said device and a supporting portion, with an air space between said portions, said indicating means being supported adjacent an outer surface of said supporting portion.

LAMONT BURTON KOONTZ.

REFERENCES CITED

The following references are of record in the file of this patent:

UNITED STATES PATENTS

| Number | Name | Date |
|---|---|---|
| 1,765,842 | Loepsinger | June 24, 1930 |
| 1,791,020 | Wilson | Feb. 3, 1931 |
| 1,874,909 | Conklin | Aug. 30, 1932 |
| 1,885,053 | Slough | Oct. 25, 1932 |
| 1,899,532 | Shurtleff | Feb. 28, 1933 |
| 2,149,729 | Finch | Mar. 7, 1939 |
| 2,154,927 | Yaglou | Apr. 18, 1939 |
| 2,170,664 | Romander | Aug. 22, 1939 |
| 2,261,582 | Haines | Nov. 4, 1941 |
| 2,287,237 | Gedge | June 23, 1942 |
| 208,471 | Galloway | Oct. 1, 1878 |
| 2,253,352 | Siebold | Aug. 19, 1941 |

FOREIGN PATENTS

| Number | Country | Date |
|---|---|---|
| 211,360 | Germany | June 28, 1909 |

OTHER REFERENCES

Winslow, pages 41–43 of article entitled "The Thermo-Integrator, a New Instrument for the Observation of Thermal Interchanges," in magazine "Heating Piping and Air Conditioning," for January, 1935, by Domestic Engineering Co., Chicago, Ill.

Dufton, pages 249–251 of article "The Eupatheostat," Journal of Scientific Instruments, vol. 6, 1929, published in London, England.